(12) United States Patent
Stevens

(10) Patent No.: US 9,581,237 B2
(45) Date of Patent: Feb. 28, 2017

(54) TRANSMISSION FLUID EXPANSION RESERVOIR

(75) Inventor: Kenneth E. Stevens, Redford, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 707 days.

(21) Appl. No.: 13/174,173

(22) Filed: Jun. 30, 2011

(65) Prior Publication Data

US 2013/0000761 A1    Jan. 3, 2013

(51) Int. Cl.
| F16H 57/04 | (2010.01) |
| F16N 19/00 | (2006.01) |
| F01M 11/06 | (2006.01) |
| F01P 11/02 | (2006.01) |

(52) U.S. Cl.
CPC ....... F16H 57/0447 (2013.01); F01M 11/061 (2013.01); F01P 11/029 (2013.01); F16H 57/0413 (2013.01); F16N 19/006 (2013.01); Y10T 137/86381 (2015.04)

(58) Field of Classification Search
CPC ............. F16H 57/0413; F16H 57/0447; F16H 57/045; F01M 11/061; F16N 19/006; F01P 11/029; F01P 2007/146; G05D 23/08
USPC .......... 236/34.5, 93 R, 101 R, 101 A, 101 E; 137/593, 599.01, 599.14, 601.05, 601.08; 165/300; 475/161
See application file for complete search history.

(56) References Cited

U.S. PATENT DOCUMENTS

| 3,300,135 A | * | 1/1967 | Slater et al. ................. 236/34.5 |
| 4,301,824 A | * | 11/1981 | Payne ............................ 137/110 |
| 4,930,455 A | * | 6/1990 | Creed et al. ................. 123/41.1 |
| 4,962,830 A | * | 10/1990 | Potts ............................... 184/6.4 |
| 6,012,550 A | * | 1/2000 | Lee ................................ 184/6.22 |
| 6,427,640 B1 | * | 8/2002 | Hickey et al. ............. 123/41.31 |
| 6,830,527 B2 | * | 12/2004 | Wakayama ................... 475/161 |
| 7,665,513 B2 | * | 2/2010 | Sasaki ............................ 165/298 |
| 2008/0029246 A1 | * | 2/2008 | Fratantonio et al. ......... 165/103 |
| 2010/0062890 A1 | * | 3/2010 | Shimizu ................... 137/599.09 |

FOREIGN PATENT DOCUMENTS

| DE | 102005007386 A1 | 8/2006 |
| JP | 05033853 A | 2/1993 |

* cited by examiner

*Primary Examiner* — Len Tran
*Assistant Examiner* — Hans Weiland

(57) ABSTRACT

An active fluid reservoir for transmission fluid of an automatic transmission, in a first embodiment, comprehends an elongate reservoir disposed adjacent fluid lines from the automatic transmission to the transmission fluid cooler. The reservoir may be associated with either the supply or return line or include two smaller reservoirs associated with both lines. Thermally actuated valves at each end of the reservoir (s) open to allow fluid flow through the reservoir as fluid temperature increases and a diverter valve in the cooler line(s) closes to divert flow into the reservoir. In a second embodiment, the fluid reservoir comprehends a container, tank or similar storage device in fluid communication with a transmission oil cooler line. Again, the device includes three thermally actuated valves.

19 Claims, 2 Drawing Sheets

TRANSMISSION FLUID EXPANSION RESERVOIR

FIELD

The present disclosure relates to automatic transmissions and more particularly to fluid expansion reservoirs for automatic transmissions.

BACKGROUND

The statements in this section merely provide background information related to the present disclosure and may or may not constitute prior art.

Motor vehicle automatic transmissions must and do provide both reliable torque multiplication and torque and speed matching over a wide range of both ambient and operating temperatures. The operating temperature of an automatic transmission may be considered to range from cold, i.e., a winter morning start, through warm, i.e., normal operation, to hot, i.e., maximum operating temperature. The fluid within a transmission, commonly referred to as "automatic transmission fluid" or ATF, contracts when it is cold and expands when it is hot. Thus, the noted temperature limits correspond to the minimum and maximum volumes of transmission fluid for a given mass of transmission fluid.

The minimum design or start up temperature dictates the minimum mass of transmission fluid required in the transmission. Under this operating condition, the transmission fluid is most dense which reduces the volume of transmission fluid within the transmission sump and transmission and the viscosity of the fluid is at a maximum thereby further reducing sump and transmission fluid volume due to fluid coating or adhering to transmission components and surfaces.

The maximum design or operating temperature dictates the maximum transmission sump fluid volume which maintains a fluid level below the rotating components of the transmission. If the transmission fluid contacts the rotating components, the fluid will become foamy with entrained air which increases frictional drag and adds heat to the transmission fluid. Eventually, the entrained air will interfere with the action of the transmission pump, transmission fluid pressure will drop, forcing a transmission shutdown and possibly causing damage to the transmission.

It is therefore apparent that the automatic transmission and transmission fluid cooling system must accommodate the cold and, more significantly, the hot volume of transmission fluid, while maintaining intended and desired vehicle performance. This requirement, in addition to the requirements of various vehicle ride heights, suspension components and various engine configurations have proliferated the number of transmission oil (ATF) pans and filter/pump pickups for the same model of automatic transmission.

The present invention is directed to an apparatus for accommodating the volume change of transmission fluid from cold to hot while maintaining proper transmission sump and operating levels.

SUMMARY

The present invention provides an active fluid reservoir for the transmission fluid of an automatic transmission. In a first embodiment, the fluid reservoir comprehends an elongate reservoir disposed adjacent and parallel to fluid lines leading from the automatic transmission to the transmission oil (fluid) cooler (TOO). Depending upon available space, the reservoir may be a single, larger reservoir associated with either the supply or return line or two smaller reservoirs associated with both lines. Thermally actuated valves at each end of the reservoir(s) open to allow fluid flow through the reservoir as fluid temperature increases and a diverter valve in the cooler line(s) closes to divert flow into the reservoir. In a second embodiment, the fluid reservoir comprehends a container, tank or similar storage device in fluid communication with a transmission oil cooler (TOO) line. Again, the device includes thermally actuated valves which open to provide fluid flow from the oil cooler line to the reservoir and a diverter valve in the oil cooler line which closes upon a temperature increase to divert flow to the reservoir. In both embodiments, the reservoir must be located above the transmission sump to that the transmission fluid returns by gravity to the sump when the engine and transmission are not operating.

It is thus an aspect of the present invention to provide an active transmission fluid reservoir for automatic transmissions.

It is a further aspect of the present invention to provide a transmission fluid reservoir having a pair of thermally actuated flow valves and a thermally actuated diverter valve.

It is a still further aspect of the present invention to provide a transmission fluid reservoir having at least one elongate reservoir disposed along a transmission oil cooler line.

It is a still further aspect of the present invention to provide a transmission fluid reservoir having at least one elongate reservoir disposed along a transmission oil cooler line, a pair of flow controlling valves and a diverter valve.

It is a still further aspect of the present invention to provide a transmission fluid reservoir having at least one elongate reservoir disposed along a transmission oil cooler line, a pair of thermally actuated flow controlling valves and a thermally actuated diverter valve.

It is a still further aspect of the present invention to provide a transmission fluid reservoir having a pair of elongate reservoirs disposed along a respective pair of transmission oil cooler lines.

It is a still further aspect of the present invention to provide a transmission fluid reservoir having a storage container.

It is a still further aspect of the present invention to provide a transmission fluid reservoir having a storage container, a pair of flow controlling valves and a diverter valve.

It is a still further aspect of the present invention to provide a transmission fluid reservoir having a storage container, a pair of thermally actuated flow controlling valves and a thermally actuated diverter valve.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
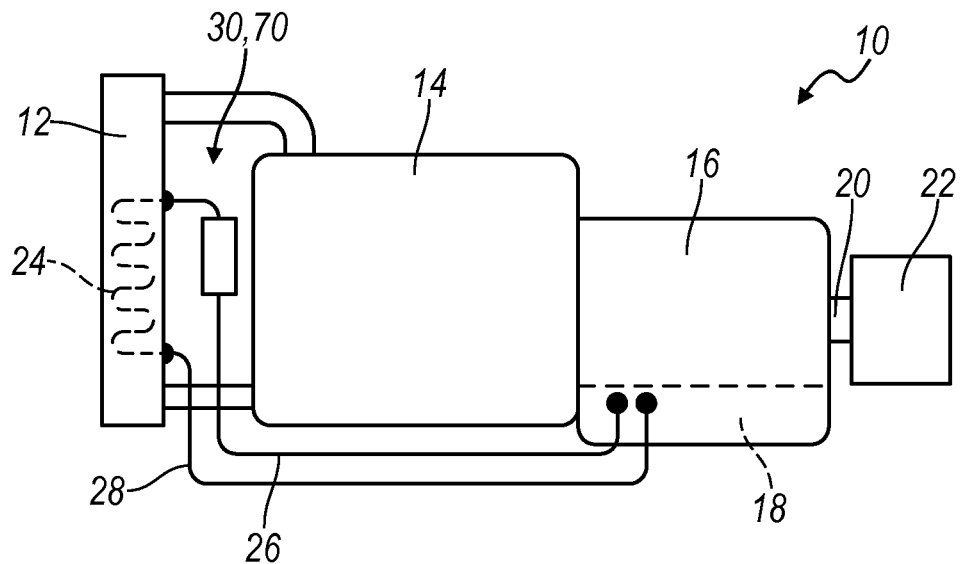
FIG. 1 is a schematic diagram of a portion of an exemplary motor vehicle powertrain having a radiator, an engine and a transmission and incorporating the present invention.

With reference to FIG. 1, a portion of a motor vehicle powertrain incorporating the present invention is illustrated and generally designated by the reference number 10. The illustrated powertrain 10 includes a radiator 12 which is in fluid communication with an engine 14 which may be a gas, Diesel or flex fuel engine. The output of the engine 14 is coupled to the input of a transmission 16. The transmission includes a fluid sump 18 into which transmission fluid flows under the influence of gravity and is collected. The transmission 16 also includes an output shaft 20 which drives a final drive assembly (FDA) 22 which may include, for example, a prop shaft, a differential, axles and tires and wheels (all not illustrated).

The radiator 12 includes a transmission oil (fluid) cooler 24 disposed therewithin. The transmission oil cooler 24 is in fluid communication with the transmission 16 through a pair of fluid lines, pipes or hoses 26 and 28, one of which (26) functions as a supply line of hotter fluid from the transmission 16 to the transmission oil cooler 24 in the radiator 12 and the other of which (28) functions as a return line of cooler fluid from the transmission oil cooler 24 to the transmission 16.

Disposed in one of the fluid lines, pipes or hoses, preferably the supply line 26, is an active transmission fluid expansion reservoir assembly 30. At the outset, it should be noted that the transmission fluid expansion reservoir assembly 30 must be disposed generally above the level of the sump 18 of the transmission 16 such that when the engine 14 and transmission 16 are not operating, fluid which has accumulated in the transmission fluid expansion reservoir assembly 30 will return to the sump 18 under the influence of gravity.

Figure 2:
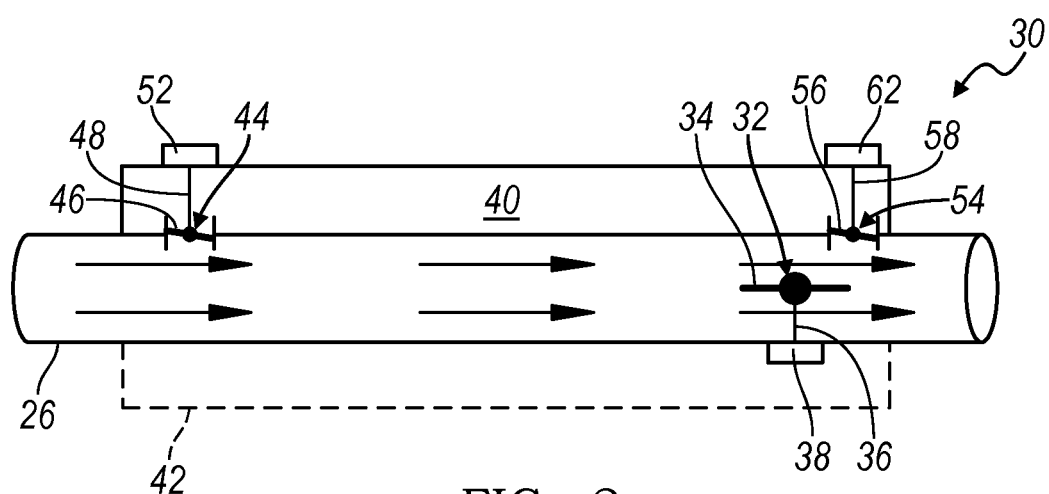
FIG. 2 is a diagrammatic view of a first embodiment of a transmission fluid reservoir according to the present invention in a cold or low temperature operating state or condition.
Figure 3:
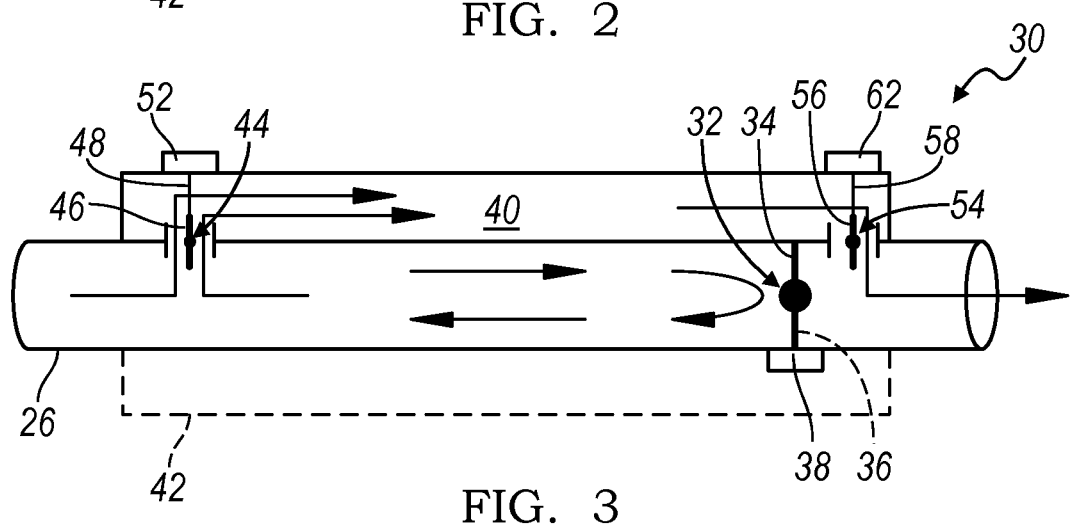
FIG. 3 is a diagrammatic view of a first embodiment of a transmission fluid reservoir according to the present invention in a hot or high temperature operating state or condition.

Turning now to FIGS. 2 and 3, a first embodiment of an active transmission fluid expansion reservoir assembly 30 is illustrated in fluid communication with the transmission oil cooler supply line 26. The transmission fluid expansion reservoir assembly 30 is an in-line, cylindrical assembly and typically occupies an axial distance of several inches along the length of and parallel to the cooler supply line 26. If packaging and space limitations do not permit such a configuration, multiple, smaller reservoir assemblies may be utilized, for example, one on each of the supply and return lines 26 and 28.

Disposed within the cooler supply line 26 is a first or diverter valve 32 which is capable of substantially fully opening and fully closing the flow path through the cooler supply line 26. The first or diverter valve 32 preferably comprehends a circular disc 34 or similar valve structure such as a ball valve that is opened and closed through 90 degrees of rotation. Other valve configurations such as a sliding valve, a poppet valve or an iris valve—the common feature of such valves being their full opening and closing with relatively limited input motion—may also be utilized here and at the other valve locations. The circular disc 34 is secured to a shaft or rod 36 that is supported by the wall of the cooler supply line 26 or other suitable structure and is coupled to a bi-metallic operator 38. As the temperature of the transmission oil in the cooler supply line 26 increases, the bi-metallic operator 38 rotates the circular disc 34 from the position illustrated in FIG. 2 which allows unrestricted fluid flow of transmission oil through the cooler supply line 26 to the position illustrated in FIG. 3 which closes off the cooler supply line 26 and inhibits flow therethrough. Alternatively, the bi-metallic operator 38 may be replaced by an operator utilizing the thermal expansion of a fluid. Additionally, it should be appreciated that the circular disc 34 (or other valve configuration) may be coupled to and rotated by an electric, hydraulic or pneumatic actuator controlled by a signal from a temperature sensor such as a thermistor located, for example within the transmission 16.

The in-line transmission fluid expansion reservoir assembly 30 also includes a reservoir 40 that preferably extends axially along one side of the cooler supply line 26. Alternatively, the reservoir 40 may be concentrically disposed about the cooler supply line 26 as indicated by the dashed reference line 42. At the upstream end of the reservoir 40, between the cooler supply line 26 and the reservoir 40, is disposed a second or inlet valve 44. The second or inlet valve 44 may be of construction similar to that of the first or diverter valve 32. Thus, it may include a circular disc 46 that is attached to a shaft 48 that is rotated by a bi-metal operator 52. At the downstream end of the reservoir 40, between the cooler supply line 26 and the reservoir 40, is disposed a third or outlet valve 54. The third or outlet valve 54 may also be of construction similar to that of the first or diverter valve 32. Thus it may include a circular disc 56 that is attached to a shaft 58 that is rotated by a bi-metal operator 62.

The second or inlet valve 44 and the third or outlet valve 54 operate in unison but in opposition to the first or diverter valve 32. That is, as the temperature of the transmission fluid increases, the bi-metallic operators 52 and 62 rotate the second or inlet valve 44 and the third or outlet valve 54, respectively, from the closed positions illustrated in FIG. 2 to the open positions illustrated in FIG. 3. Thus, as the second or inlet valve 44 and the third or outlet valve 54 open, the first or diverter valve 32 closes. Once again, it should be appreciated that all three valves 32, 44 and 54 may be controlled by one or more electric, hydraulic or pneumatic operators controlled by a signal from temperature sensor located, for example, within the transmission 16.

Accordingly, during operation of the engine 14 and the transmission 16, as the temperature of the transmission fluid increases, the diverter valve 32 closes and the inlet valve 44 and the outlet valve 54 open, providing the additional volume of the reservoir 40 to the fluid circuit which accommodates the temperature related expansion of the transmission fluid. When the engine 14 is shut off and the transmission fluid and the transmission 16 cool down, the diverter valve 32 re-opens and the inlet valve 44 and the outlet valve 54 close. As this is occurring, the transmission fluid is also contracting and, before the outlet valve 54 fully closes, the transmission fluid which has accumulated in the reservoir 40 flows into the sump 18 of the transmission 16 under the influence of gravity.

Figure 4:
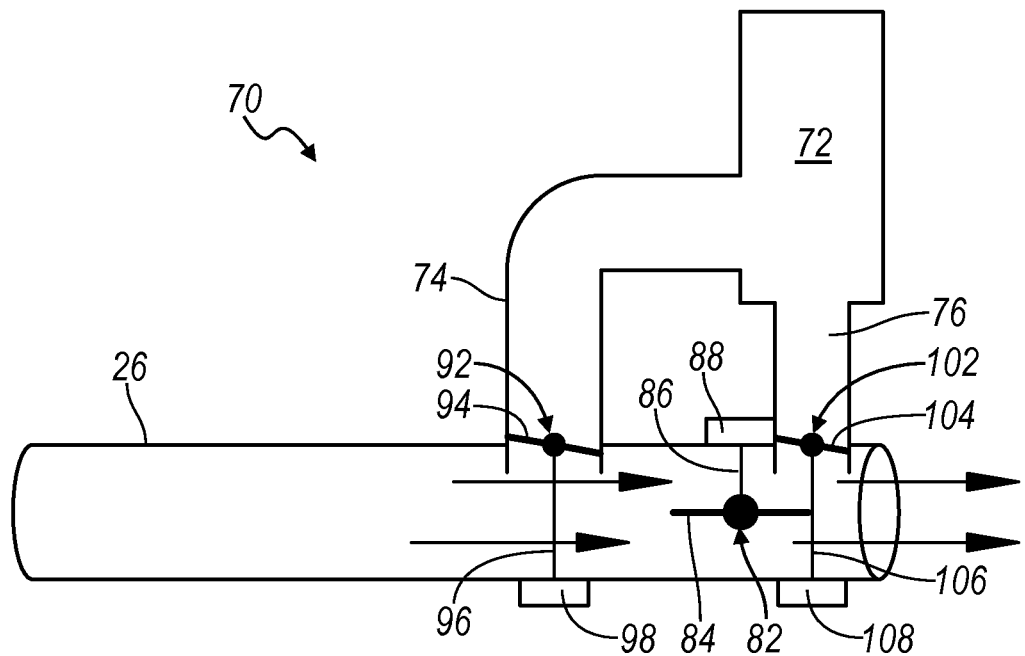
FIG. 4 is a diagrammatic view of a second embodiment of a transmission fluid reservoir according to the present invention in a cold or low temperature operating state or condition.
Figure 5:
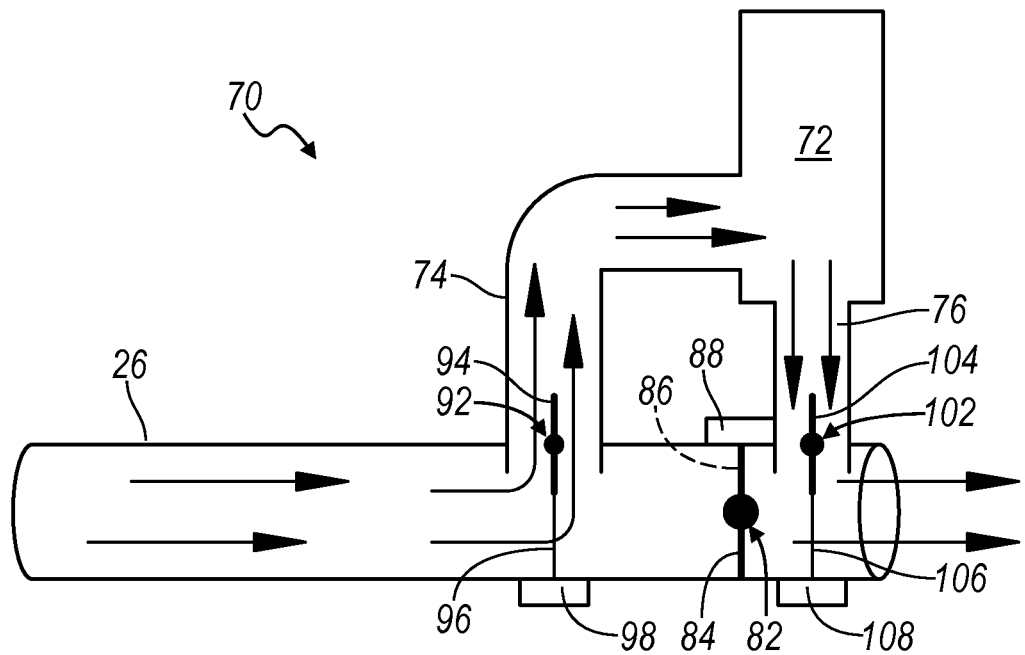
FIG. 5 is a diagrammatic view of a second embodiment of a transmission fluid reservoir according to the present invention in a hot or high temperature operating state or condition.

Referring now to FIGS. 4 and 5, a second embodiment of an active transmission fluid expansion reservoir assembly 70 employing a container or tank as the fluid reservoir is illustrated in conjunction with the transmission oil cooler supply line 26. The transmission fluid expansion reservoir assembly 70 includes a container or tank 72 which may be located at any convenient location above the level of the sump 18 of the transmission 16 and mounted to any convenient under-hood component such as the radiator 12, the engine 14 or the transmission 16. The container or tank 72 includes an inlet line or tube 74 in fluid communication with the transmission oil cooler supply line 26 and an outlet line or tube 76 also in fluid communication with the transmission oil cooler supply line 26.

Disposed within the transmission oil cooler supply line 26 is a first or diverter valve 82 which is capable of substantially fully opening and fully closing the flow path through the cooler supply line 26. The first or diverter valve 82 preferably comprehends a circular disc 84 or similar valve structure that is opened and closed through 90 degrees of rotation. The circular disc 84 is secured to a shaft or rod 86 that is supported by the wall of the cooler supply line 26 or other suitable structure and is coupled to a bi-metallic operator 88. As the temperature of the transmission oil in the cooler supply line 26 increases, the bi-metallic operator 88 rotates the circular disc 84 from the open position illustrated in FIG. 4 which allows unrestricted fluid flow of transmission oil through the cooler supply line 26 to the closed position illustrated in FIG. 5 which closes off the cooler supply line 26 and inhibits flow therethrough. Again, it should be appreciated that the circular disc 84 may be coupled to and rotated by an electric, hydraulic or pneumatic actuator controlled by a signal from a temperature sensor located, for example, within the transmission 16.

At the juncture of the inlet line or tube 74 and the transmission oil cooler supply line 26, the tank type transmission fluid expansion reservoir assembly 70 includes a second or inlet valve 92. The second or inlet valve 92 may be of construction similar to that of the first or diverter valve 82. Thus it may include a circular disc 94 that is attached to a shaft 96 that is rotated by a bi-metal operator 98. At the juncture of the outlet line or tube 76 and the cooler supply line 26, is a third or outlet valve 102. The third or outlet valve 102 may also be of construction similar to that of the first or diverter valve 82. Thus it may include a circular disc 104 that is attached to a shaft 106 that is rotated by a bi-metal operator 108.

The second or inlet valve 92 and the third or outlet valve 102 operate in unison but in opposition to the first or diverter vale 82. That is, as the temperature of the transmission fluid increases, the bi-metallic operators 88 and 108 respectively rotate the second or inlet valve 92 and the third or outlet valve 102 from the closed positions illustrated in FIG. 4 to the open positions illustrated in FIG. 5. Thus, as the second or inlet valve 92 and the third or outlet valve 102 open, the first or diverter valve 82 closes. Once again, it should be appreciated that all three valves 82, 92 and 102 may be controlled by one or more electric, hydraulic or pneumatic operators controlled by a signal from temperature sensor located, for example within the transmission 16.

Accordingly, during operation of the engine 14 and the transmission 16, as the temperature of the transmission fluid increases, the diverter valve 82 closes and the inlet valve 92 and the outlet valve 102 open, providing the additional volume of the container or tank 72 to the hydraulic circuit which accommodates the temperature related expansion of the transmission fluid. When the engine 14 is shut off and the transmission fluid and the transmission 16 cool down, the diverter valve 82 re-opens and the inlet valve 92 and the outlet valve 102 close. As this is occurring, the transmission fluid is also contracting and, before the outlet valve 102 fully closes, the transmission fluid which has accumulated in the container or tank 72 flows into the sump 18 of the transmission 16 under the influence of gravity.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission fluid expansion reservoir assembly comprising, in combination, an automatic transmission having a sump, a fluid outlet and a fluid inlet, a transmission fluid cooler having a fluid inlet and a fluid outlet, a first transmission cooler line communicating only between said fluid outlet of said transmission and said fluid inlet of said transmission fluid cooler, a second transmission cooler line communicating only between said fluid outlet of said transmission fluid cooler and said fluid inlet of said transmission, a first valve disposed in said first transmission cooler line, said first valve having a first side and a second side, a fluid reservoir disposed above said sump and communicating only with said first transmission cooler line, said fluid reservoir having an inlet on said first side of said first valve and an outlet on said second side of said first valve, a second valve disposed between said first transmission cooler line and said inlet of said fluid reservoir on said first side of said first valve, a third valve disposed between said first transmission cooler line and said outlet of said fluid reservoir on said second side of said first valve, and means connected to said first valve, said second valve and said third valve for closing said first valve while opening said second and third valves and closing said second and third valves while opening said first valve.

2. The transmission fluid expansion reservoir of claim 1 wherein said fluid reservoir is cylindrical and disposed parallel to said first transmission cooler line.

3. The transmission fluid expansion reservoir of claim 1 wherein said fluid reservoir is disposed concentrically about said first transmission cooler line.

4. The transmission fluid expansion reservoir of claim 1 wherein said fluid reservoir is a container.

5. The transmission fluid expansion reservoir of claim 1 wherein said means for opening and closing includes at least one bi-metal operator.

6. The transmission fluid expansion reservoir of claim 1 wherein said first transmission cooler line supplies transmission oil to said transmission fluid cooler.

7. A transmission fluid expansion reservoir assembly for an automatic transmission comprising, in combination, an automatic transmission including a sump, a fluid outlet and a fluid inlet, a transmission fluid cooler having a fluid inlet and a fluid outlet, a transmission cooler supply line providing fluid flow only between said fluid outlet of said automatic transmission and said fluid inlet of said transmission fluid cooler, a transmission cooler return line providing fluid flow only between said fluid outlet of said transmission fluid cooler and said fluid inlet of said transmission, a diverter valve disposed in said transmission cooler supply line, said diverter valve having a first side and a second side, a fluid reservoir positioned above said sump of said automatic transmission and communicating only with said transmission cooler supply line, said fluid reservoir having an inlet on said first side of said diverter valve and an outlet on said second side of said diverter valve, an inlet valve disposed between said transmission cooler supply line and said inlet of said fluid reservoir on said first side of said diverter valve, an outlet valve disposed between said transmission cooler supply line and said outlet of said fluid reservoir on said second side of said diverter valve, and means for closing said diverter valve while opening said inlet and outlet valves and closing said inlet and outlet valves while opening said diverter valve.

8. The transmission fluid expansion reservoir of claim 7 wherein said means for opening and closing includes at least one bi-metal operator.

9. The transmission fluid expansion reservoir of claim 7 wherein said transmission cooler supply line supplies transmission oil to a transmission oil cooler.

10. The transmission fluid expansion reservoir of claim 7 wherein said fluid reservoir is cylindrical and disposed parallel to said transmission cooler supply line.

11. The transmission fluid expansion reservoir of claim 7 wherein said fluid reservoir is disposed concentrically about said transmission cooler supply line.

12. The transmission fluid expansion reservoir of claim 7 wherein said fluid reservoir is a container.

13. An active transmission fluid expansion reservoir assembly for an automatic transmission comprising, in combination, an automatic transmission having a sump, a fluid outlet and a fluid inlet, a radiator adapted to reject heat, a transmission fluid cooler disposed in said radiator and having a fluid inlet and a fluid outlet, a first transmission cooler line extending between said fluid outlet of said automatic transmission and said fluid inlet of said transmission fluid cooler, a second transmission cooler line extending only between said fluid outlet of said transmission fluid cooler and said fluid inlet of said automatic transmission, a diverter valve disposed in said first transmission cooler line, said diverter valve having a first side and a second side and including a first operator for closing said diverter valve upon an increase in temperature, a fluid reservoir disposed above a level of said sump and communicating only with said first transmission cooler line, said fluid reservoir having an inlet on said first side of said diverter valve and an outlet on said second side of said diverter valve, an inlet valve disposed between said first transmission cooler line and said inlet of said fluid reservoir on said first side of said diverter valve, said inlet valve including a second operator for opening said inlet valve upon an increase in temperature, and an outlet valve disposed between said first transmission cooler line and said outlet of said fluid reservoir on said second side of said diverter valve, said outlet valve including a third operator for opening said outlet valve upon an increase in temperature.

14. The transmission fluid expansion reservoir of claim 13 wherein said fluid reservoir is cylindrical and disposed parallel to said first transmission cooler line.

15. The transmission fluid expansion reservoir of claim 13 wherein said fluid reservoir is disposed concentrically about said first transmission cooler line.

16. The transmission fluid expansion reservoir of claim 13 wherein said fluid reservoir is a container.

17. The transmission fluid expansion reservoir of claim 13 wherein said valve operators are bi-metal actuators.

18. The transmission fluid expansion reservoir of claim 1 wherein said first, second and third valves are disc valves.

19. The transmission fluid expansion reservoir of claim 7 wherein said diverter valve, said inlet valve and said outlet valve are disc valves.

\* \* \* \* \*